Jan. 2, 1951   A. FRIEDMAN   2,536,635
APPARATUS FOR COATING FROZEN
CONFECTIONS AND THE LIKE
Filed June 21, 1946
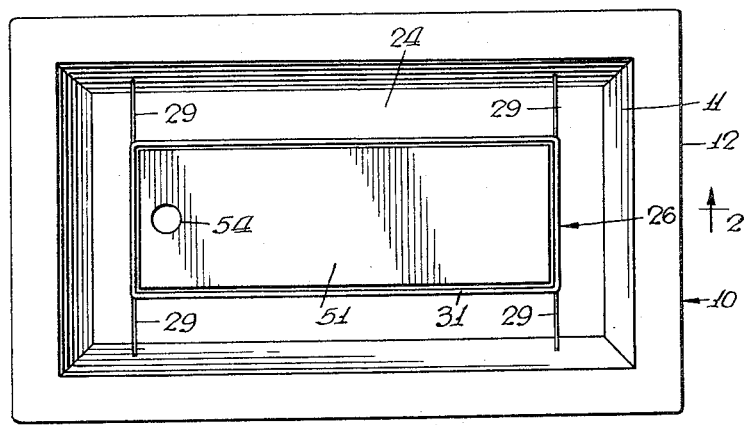
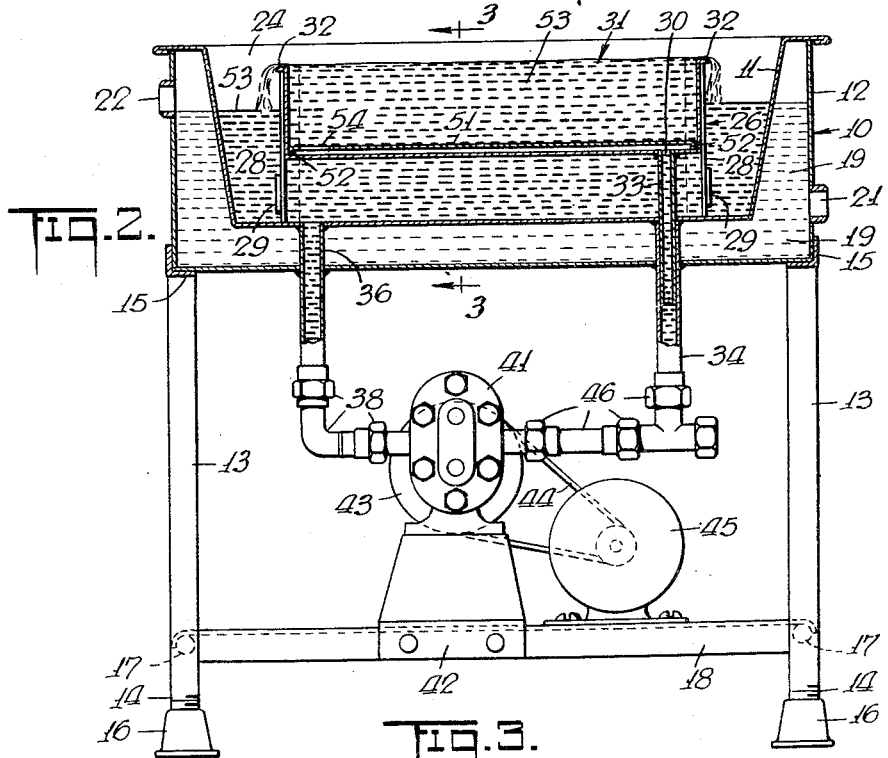
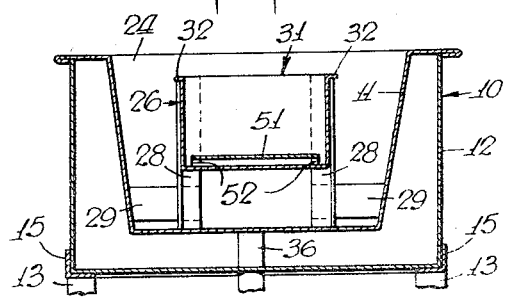
INVENTOR
*Aaron Friedman*
BY
*Richard J. Newbury*
ATTORNEY Patented Jan. 2, 1951

2,536,635

UNITED STATES PATENT OFFICE 2,536,635

APPARATUS FOR COATING FROZEN CONFECTIONS AND THE LIKE

Aaron Friedman, New York, N. Y., assignor to Joe Lowe Corporation, New York, N. Y., a corporation of Delaware Application June 21, 1946, Serial No. 678,520

1 Claim. (Cl. 91—4)

The present invention relates generally to coating apparatus, and it has particular relation to apparatus for dip coating frozen confectionery products.

Heretofore, in the coating of confectionery products it has been customary to maintain the coating material in a molten condition in a steam or water jacketed kettle into which the products are momentarily immersed manually or mechanically. In the case of frozen confectionery products, it is well understood that each time a frozen product is submerged in the molten material there is some melting of its outer surface and a depositing of the melted liquid material, which is largely water, into the coating material. It is also well understood that the collection of such residual water droplets in the coating material, and especially chocolate, has a tendency to render such coating material unsuitable for further use as a dipping coating. In the case of chocolate a collection of water in an amount as little as one per cent by weight tends to cause the coating to become thick so that it will not coat properly when the confectionery products are dipped therein. Such coating material can be used as a flavoring material in the making of candy, chocolate flavored ice creams, and the like.

With the present invention, the coating material is kept circulating constantly between a relatively small dipping tank and a relatively larger reserve reservoir so that any water diluent will be distributed throughout the entire mass of coating material in the system instead of being collected in the relatively small quantity contained in the actual dipping tank, thereby permitting a greatly increased working period for coating confections without requiring the removal and replacement of the coating material because of the residual collection of water therein.

An object of the present invention is to provide a novel and improved coating apparatus which will permit the coating of frozen confectionery products efficiently, economically, and sanitarily.

Another object of the invention is the provision of a simple, efficient, and inexpensive apparatus for providing a convenient and highly efficient coating operation for frozen confectionery products.

A further object of the invention is to provide a coating apparatus wherein the actual dipping tank is maintained filled at all times with a sufficient quantity of coating material regardless of the amount of material in the system.

Other and further objects and advantages of the apparatus, which result in simplicity, economy and efficiency, will be apparent from the following description, wherein a preferred embodiment of the invention is shown, reference being had to the accompanying drawings, forming a part hereof, wherein like numerals indicate like parts, in which:

Figure 1 is a top plan view of an apparatus embodying the principles of the invention;

Figure 2 is a longitudinal sectional view of the apparatus shown in Figure 1, the same having been taken substantially along the line 2—2 thereof, looking in the direction of the arrows; and Figure 3 is a cross-sectional view of the apparatus shown in Figure 2, the same having been taken substantially along the line 3—3 thereof, looking in the direction of the arrows.

Referring now to the drawings, there is shown a relatively large double walled open-top outer tank 10, having suitably spaced inner walls 11 and outer walls 12 adapted to be mounted upon a plurality of cylindrical legs 13, the lower ends of which are threaded externally, as indicated at 14, for receiving enlarged base members or shoes 16, which have been correspondingly threaded internally for mounting on the legs 13. In this manner, the base members 16 are adjustable on the legs 13 to provide a suitable and convenient means for leveling the apparatus when the same is installed. The legs 13 are suitably connected together at their tops by angle iron strips 15, and braced intermediate their ends by circular cross rods 17 and longitudinal angle iron braces 18. The jacketed space between the inner and outer walls is adapted to be filled with a liquid heating medium 19. A suitable inlet port 21 is provided at one end adjacent the bottom thereof, and a similar outlet or drain port 22 is provided at the opposite end adjacent the top thereof. In conventional practice, the heating liquid medium 19 is generally water, which is heated by steam introduced from an outside source of supply (not shown) through the inlet port 21. The steam which is so introduced condences in the water 19, and the excess water is drained off through the outlet or drain port 22.

Mounted centrally within the chamber 24 defined by the inner walls 11 of the outer tank 10, which shall hereinafter be referred to as the reservoir tank, is a removable upright supporting structure 26 consisting of four spaced angle iron legs 28, each of which has a fixed spacing arm 29 extending laterally therefrom and adapted to fit slidably against the adjacent inner sloping sidewall 11 of the reservoir tank 24. An open-top stationary inner tank 31, which shall hereinafter be referred to as the dipping tank, is adapted to be mounted removably upon the upright supporting structure 26 by means of its outwardly and laterally extending top edge flange 32. The bottom of the dipping tank 31 is provided with a suitable inlet aperture 39 into which is mounted an inlet pipe 33.

An inlet pipe 34 is mounted through the bottom of the jacketed outer tank 10, and is adapted to slidingly receive the lower end of the inlet pipe 33 depending from the bottom of the dipping tank 31. An outlet pipe 36 is also mounted through the bottom of the inner wall 11 of the jacketed outer tank 10 at a distance spaced from the inlet pipe 33, and its lower free end is connected through suitable conventional pipe connections and fittings 38 to a conventional pump 41, which is mounted on a supporting bracket 42 secured to the angle iron cross braces 18 connecting the legs 13. The pump 41 is operated through a conventional reduction gear 43, which in turn is driven by a belt 44 connected with the drive shaft of a conventional electric motor 45. The delivery or outlet side of the pump 41 is connected through a series of conventional pipe connections and fittings 46 to the inlet pipe 34.

A horizontal rack 51, having relatively short downwardly projecting legs 52, is removably mounted on the bottom on the inside of the dipping tank 31, providing a false bottom therefor, which in turn serves to control the distance to which confectionery products (not shown) can be immersed in the dipping coating 53. By substituting a rack having supporting legs of greater length, the depth of coating material in the dipping tank 31 can be reduced so that when shorter confectionery products are being coated only the edible portion can be submerged, thereby preventing the coating contacting the handle member. In this apparatus, the depth of immersion is not dependent upon the skill of the operator. The rack 51 is provided with an inlet opening 54 spaced from the inlet port 33 to facilitate the distribution of the incoming coating material in the dipping tank 31 without splashing or surging.

In describing the operation of the apparatus and the coating of confectionery products, it will be assumed that the heating liquid 19 in the double jacketed outer tank 10 is at the proper temperature to melt and maintain the coating material 53 in its proper molten state. The motor 45 is now ready to be started. This will cause the pump 41 to begin to pump or circulate the coating material 53 between the dipping tank 31 and the reserve reservoir tank 24. The coating material 53 in the reservoir tank 24 will be withdrawn therefrom into the outlet pipe 36 and through the pipe connections 38 into the pump 41. The pump 41 will in turn force the coating material 53 through the fittings 46 into the inlet pipe 34, which in turn delivers the coating material 53 into the connecting pipe 33 and into the dipping tank 31. The molten coating material 53 upon entering the dipping tank 31 will surge upwardly between the sides of the rack 51 and reserve reservoir 24 and through the inlet opening 54 in the rack or false bottom 51, thereby completely filling the dipping tank 31, and cause the same to overflow therefrom on all sides back into the jacketed reserve reservoir 24. The confectionery products (not shown) upon being momentarily dipped in the coating material 53 in the dipping tank until their free bottom ends contact the rack 51 will obviously displace a large volume of coating material 53 from the dipping tank 31 into the reserve reservoir supply tank 10. However, almost instantaneously and long before the operator is ready to dip another group of confections, the pump 41 will have again refilled the dipping tank 31 with coating material 53 to overflowing capacity.

Thus, it will be apparent that a constant and adequate supply of coating material 53 is always maintained in the dipping tank 31 regardless of the quantity of coating material 53 contained in the apparatus, and that any residual water or other meltings from the frozen confectionery products will be widely diffused throughout the relatively large volume of coating material 53 contained in the apparatus so that only relatively infrequent changes of coating material will be required in operating the same.

This constant circulation also tends to maintain an even and satisfactory dipping coating temperature at all times throughout the entire volume of coating material, and therefore insures uniform coatings of the desired thickness on the finished confections throughout the period of operation of the apparatus.

Although I have described only one embodiment of the invention, it will be readily apparent to those skilled in the art that the same is not to be so limited, but that various other modifications may be made therein without departing from the spirit thereof or from the scope of the appended claim.

What I claim is:

Apparatus for coating frozen confections and the like comprising an open-top heating tank having a relatively large coating receiving reserve reservoir, a relatively small stationary open-top dipping tank mounted in said reserve reservoir, said dipping tank having a horizontal rack adapted to be mounted on the bottom thereof to limit the distance into which confections may be immersed in a coating material contained therein, said small dipping tank and horizontal rack being removable for cleaning purposes, and pumping means for delivering coating from said reserve reservoir through the bottom of said dipping tank and under said rack whereby the dipping tank may be maintained in an overflowing condition without turbulence regardless of the quantity of coating material in said reserve reservoir.

AARON FRIEDMAN.

REFERENCES CITED

The following references are of record in the file of this patent:

UNITED STATES PATENTS

| Number | Name | Date |
| --- | --- | --- |
| 719,896 | Spang | Feb. 3, 1903 |
| 915,291 | Herisse | Mar. 16, 1909 |
| 1,294,946 | Pupilla | Feb. 18, 1919 |
| 1,407,729 | Buckminster | Feb. 28, 1922 |
| 1,770,620 | Mann | July 15, 1930 |
| 2,159,091 | Kopitke | May 23, 1939 |